US005688844A

United States Patent [19]
Chatterji et al.

[11] Patent Number: 5,688,844
[45] Date of Patent: Nov. 18, 1997

[54] RESILIENT WELL CEMENT COMPOSITIONS AND METHODS

[75] Inventors: Jiten Chatterji; Bobby J. King; Patty L. Totten, all of Duncan; David D. Onan, Lawton, all of Okla.

[73] Assignee: Halliburton Company, Duncan, Okla.

[21] Appl. No.: 673,970

[22] Filed: Jul. 1, 1996

[51] Int. Cl.$^6$ .................... E21B 33/14; C08K 3/34; C08J 9/12

[52] U.S. Cl. .................. 524/8; 524/3; 524/5; 524/7; 523/130; 521/83; 166/293

[58] Field of Search .................... 521/83; 523/130; 524/5, 8, 7, 3; 166/293

[56] References Cited

U.S. PATENT DOCUMENTS

| | | | |
|---|---|---|---|
| Re. 28,722 | 2/1976 | Sanders | 524/8 |
| 4,039,345 | 8/1977 | Emig et al. | 524/8 |
| 4,057,528 | 11/1977 | Hunt | 524/8 |
| 4,202,809 | 5/1980 | Eash | 524/8 |
| 4,398,957 | 8/1983 | Ceska et al. | 106/90 |
| 4,537,918 | 8/1985 | Parcevaux et al. | 523/130 |
| 4,721,160 | 1/1988 | Parcevaux et al. | 166/293 |
| 4,767,460 | 8/1988 | Parcevaux et al. | 106/90 |
| 4,927,462 | 5/1990 | Sugama | 106/99 |
| 5,004,506 | 4/1991 | Allen et al. | 106/729 |
| 5,159,980 | 11/1992 | Onan et al. | 166/294 |
| 5,185,389 | 2/1993 | Victor | 524/2 |
| 5,188,176 | 2/1993 | Carpenter | 166/285 |
| 5,258,428 | 11/1993 | Gopalkrishnan | 524/2 |
| 5,262,452 | 11/1993 | Gopalkrishnan | 523/130 |
| 5,293,938 | 3/1994 | Onan et al. | 166/293 |
| 5,300,542 | 4/1994 | Sopalkrishnsan | 524/8 |
| 5,389,706 | 2/1995 | Heathman et al. | 524/5 |
| 5,401,786 | 3/1995 | Gopalkrishnan | 524/5 |
| 5,476,343 | 12/1995 | Sumner | 405/157 |
| 5,588,488 | 12/1996 | Vijn et al. | 166/293 |

FOREIGN PATENT DOCUMENTS 0904973  9/1962  United Kingdom.

*Primary Examiner*—Peter A. Szekely
*Attorney, Agent, or Firm*—Craig W. Roddy; C. Clark Dougherty, Jr.

[57] ABSTRACT

The present invention provides resilient cement compositions and methods which are particularly useful in the construction and repair of oil and gas wells. The cement compositions have improved mechanical properties including elasticity and ductility and are basically comprised of cementitious material, an aqueous rubber latex and a latex stabilizer.

20 Claims, No Drawings

RESILIENT WELL CEMENT COMPOSITIONS AND METHODS

BACKGROUND OF THE INVENTION

1. Field of the Invention

The present invention relates generally to cementing subterranean wells, and more particularly, to cement compositions and methods whereby the compositions set into highly resilient solid masses.

2. Description of the Prior Art

Hydraulic cement compositions are commonly utilized in subterranean well completion and remedial operations. For example, hydraulic cement compositions are used in primary cementing operations whereby pipes such as casings and liners are cemented in well bores. In performing primary cementing, a hydraulic cement composition is pumped into the annular space between the walls of the well bore and the exterior surfaces of pipe disposed therein. The cement composition is permitted to set in the annular space thereby forming an annular sheath of hardened substantially impermeable cement therein. The cement sheath physically supports and positions the pipe in the well bore and bonds the exterior surfaces of the pipe to the walls of the well bore whereby the undesirable migration of fluids between zones or formations penetrated by the well bore is prevented. The cement compositions utilized in primary cementing must often be lightweight to prevent excessive hydrostatic pressures from being exerted on formations penetrated by well bores.

The transition time of a well cement composition is the time after its placement in a subterranean zone penetrated by a well bore during which the cement composition changes from a true fluid to a hard set mass. During the transition time, the cement composition becomes partially self-supporting which lowers the hydrostatic pressure exerted by the cement composition on formations containing pressurized fluid penetrated by the well bore. That is, when the cement composition becomes partially self-supporting, volume reductions in the cement composition caused by fluid loss to adjacent formations and hydration of the cement result in rapid decreases in the hydrostatic pressure exerted by the cement composition. When the fluid phase within the cement matrix is not compressible and the pressure exerted by the cement composition falls below the pressure of formation fluids, the formation fluids enter the annulus and flow through the cement composition forming undesirable flow passages which remain after the cement composition sets. The use of a highly compressible fluid component, like gas, in the cement composition improves the composition's ability to maintain pressure and thus prevents the flow of formation fluids into and/or through the cement composition.

The development of wells including one or more laterals to increase production has recently taken place. Such multi-lateral wells include vertical or deviated (including horizontal) principal well bores having one or more ancillary laterally extending well bores connected thereto. Drilling and completion equipment has been developed which allows multiple laterals to be drilled from a principal cased and cemented well bore. Each of the lateral well bores can include a liner cemented therein which is tied into the principal well bore. The lateral well bores can be vertical or deviated and can be drilled into predetermined producing formations or zones at any time in the productive life cycle of the well.

In both conventional single bore wells and multi-lateral wells having several bores, the cement composition utilized for cementing casing or liners in the well bores must develop high bond strength after setting and also have sufficient resiliency, i.e., elasticity and ductility, to resist loss of pipe or formation bond, cracking and/or shattering as a result of pipe movement, impacts and/or shocks subsequently generated by drilling and other well operations. The bond loss, cracking and/or shattering of the set cement allows leakage of formation fluids through at least portions of the well bore or bores which can be highly detrimental.

Set cement in wells, and particularly the set cement forming the cement sheaths in the annuli between pipes and the walls of well bores, often fail due to shear and compressional stresses exerted on the set cement. Such stress conditions are commonly the result of relatively high fluid pressures and/or temperatures inside pipe cemented in well bores during testing, perforating, fluid injection and/or fluid production. The high internal pipe pressure and/or temperature results in expansion of the pipe, both radially and longitudinally, which places stresses on the cement sheath causing it to crack or the bonds between the exterior surfaces of the pipe and/or the well bore walls and the cement sheath to fail in the form of loss of hydraulic seal.

Another condition results from exceedingly high pressures which occur inside the cement sheath due to the thermal expansion of fluids trapped within the cement sheath. This condition often occurs as a result of high temperature differentials created during the injection or production of high temperature fluids through the well bore, e.g., wells subjected to steam recovery or the production of hot formation fluids from high temperature formations. Typically, the pressure of the trapped fluids exceeds the collapse pressure of the cement and pipe causing leaks and bond failure. Yet another compressional stress condition occurs as a result of outside forces exerted on the cement sheath due to formation shifting and overburden pressures.

In multi-lateral wells wherein pipe has been cemented in well bores using conventional well cement slurries which set into brittle solid masses, the brittle set cement cannot withstand impacts and shocks subsequently generated by drilling and other well operations carried out in the multiple laterals without cracking or shattering.

The above described failures can result in loss of production, environmental pollution, hazardous rig operations and/or hazardous production operations. The most common hazard is the presence of gas pressure at the well head.

Thus, there are needs for well cement compositions and methods whereby after setting the cement compositions are highly resilient and can withstand the above described stresses without failure. That is, there is a need for well cement compositions and methods whereby the set cement has improved mechanical properties including elasticity and ductility and failures due to pipe movement, impacts and shocks are reduced or prevented.

SUMMARY OF THE INVENTION

The present invention provides highly resilient well cement compositions having improved mechanical properties including elasticity and ductility and methods of using the compositions which meet the needs described above and overcome the deficiencies of the prior art. A well cement composition of this invention is comprised of a hydraulic cement, fumed silica present in an amount in the range of from about 5% to about 30% by weight of hydraulic cement in the composition, an aqueous rubber latex present in an amount in the range of from about 2.5% to about 45% by weight of hydraulic cement in the composition and an effective amount of a latex stabilizer.

Another well cement composition of this invention is comprised of a hydraulic cement, fumed silica present in an amount in the range of from about 5% to about 30% by weight of hydraulic cement in the composition, an aqueous rubber latex present in an amount in the range of from about 2.5% to about 45% by weight of hydraulic cement in the composition, an effective amount of a latex stabilizer, a defoaming agent, a gas, a foaming agent and a foam stabilizer. In addition to being highly resilient, this foamed cement composition is lightweight and contains a compressible gas whereby pressurized formation fluid migration through the setting cement is prevented.

Another foamed cement composition of this invention is comprised of a hydraulic cement, an aqueous rubber latex present in an amount in the range of from about 2.5% to about 45% by weight of hydraulic cement in the composition, an effective amount of a latex stabilizer, a defoaming agent, a gas, a foaming agent and a foam stabilizer.

The methods of the invention basically comprise the steps of introducing a well cement composition of this invention which sets into a high bond strength, highly resilient solid mass having elasticity and ductility into a subterranean well and allowing the cement composition to set in the well.

It is, therefore, a general object of the present invention to provide improved resilient well cement compositions and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides resilient well cement compositions having improved mechanical properties including elasticity and ductility and methods of utilizing the resilient cement compositions in cementing operations carried out in subterranean wells. While the compositions and methods are useful in a variety of well completion and remedial operations, they are particularly useful in primary cementing, i.e., cementing casings and liners in well bores including the cementing of multi-lateral subterranean wells.

A non-foamed well cement composition of this invention is basically comprised of a hydraulic cement, fumed silica present in an amount in the range of from about 5% to about 30% by weight of hydraulic cement in the composition (from about 4.5 pounds to about 30 pounds per 94 pound sack of cement), an aqueous rubber latex present in an amount in the range of from about 2.5% to about 45% by weight of hydraulic cement in the composition (from about 0.25 gallons to about 5 gallons per 94 pound sack of cement) and an effective amount of a latex stabilizer.

A variety of hydraulic cements can be utilized in accordance with the present invention including those comprised of calcium, aluminum, silicon, oxygen and/or sulfur which set and harden by reaction with water. Such hydraulic cements include Portland cements, pozzolana cements, gypsum cements, high aluminum content cements, silica cements and high alkalinity cements. Portland cements are generally preferred for use in accordance with the present invention. Portland cements of the types defined and described in *API Specification For Materials And Testing For Well Cements*, API Specification 10, 5th Edition, dated Jul. 1, 1990 of the American Petroleum Institute are particularly suitable. Preferred API Portland cements include classes A, B, C, G and H, with API classes G and H being more preferred and class G being the most preferred.

Fumed silica is a colloidal form of silica made by the combustion of silicon tetrachloride in hydrogen-oxygen furnaces. Fumed silica is of a fine particle size, and in combination with the other components of the cement compositions of this invention provides improved mechanical properties to the compositions, particularly the ability to withstand a wide range of stresses associated with subterranean well conditions without bond loss, cracking, shattering or other form of failure. The term "fumed silica" is used herein to mean the fumed silica made as described above and equivalent forms of silica made in other ways.

The fumed silica is present in the above described composition of this invention in an amount in the range of from about 5% to about 30% by weight of the hydraulic cement in the composition (from about 4.5 to about 30 lb/sack), more preferably from about 7.5% to about 15% (from about 7 to about 14 lb/sack) and most preferably about 10% (about 9.4 lb/sack). As will be understood by those skilled in the art, the fumed silica reacts with lime liberated by the hydraulic cement during hydration to form an amorphous metal silicate hydrate.

A variety of well known rubber materials can be utilized in accordance with the present invention. Such materials are commercially available in aqueous latex form, i.e., aqueous dispersions or emulsions. For example, natural rubber (cis-1,4-polyisoprene) and most of its modified types can be utilized. Synthetic polymers of various types can also be used including styrene/butadiene rubber, cis-1,4-polybutadiene rubber and blends thereof with natural rubber or styrene/butadiene rubber, high styrene resin, butyl rubber, ethylene/propylene rubbers, neoprene rubber, nitrile rubber, cis-1,4-polyisoprene rubber, silicone rubber, chlorosulfonated rubber, polyethylene rubber, epichlorohydrin rubber, fluorocarbon rubber, fluorosilicone rubber, polyurethane rubber, polyacrylic rubber and polysulfide rubber.

Of the various latexes which can be utilized, those prepared by emulsion polymerization processes are preferred. A particularly preferred latex for use in accordance with this invention is a styrene/butadiene copolymer latex emulsion prepared by emulsion polymerization. The aqueous phase of the emulsion is an aqueous colloidal dispersion of the styrene/butadiene copolymer. The latex dispersion usually includes water in an amount in the range of from about 40% to about 70% by weight of the latex, and in addition to the dispersed styrene/butadiene particles, the latex often includes small quantities of an emulsifier, polymerization catalysts, chain modifying agents and the like. The weight ratio of styrene to butadiene in the latex can range from about 10%:90% to about 90%:10%.

It is understood that styrene/butadiene latexes are often commercially produced as terpolymer latexes which include up to about 3% by weight of a third monomer to assist in stabilizing the latex emulsions. The third monomer, when present, generally is anionic in character and includes a carboxylate, sulfate or sulfonate group. Other groups that may be present on the third monomer include phosphates, phosphonates or phenolics. Non-ionic groups which exhibit stearic effects and which contain long ethoxylate or hydrocarbon tails can also be present.

A particularly suitable styrene/butadiene aqueous latex has a styrene/butadiene weight ratio of about 25%:75%, and the styrene/butadiene copolymer is suspended in a 50% by weight aqueous emulsion. This styrene/butadiene aqueous latex in combination with the other components of the cement compositions of this invention provides excellent resiliency to a set cement composition without the appreciable loss of bond strength in the set cement. A latex of this type is available from Halliburton Energy Services of Duncan, Okla. under the trade designation "LATEX 2000™." The aqueous latex used is included in the cement compositions of this invention in an amount in the range of from about 2.5% to about 45% by weight of the hydraulic cement in the composition (from about 0.25 to about 5.0 gal/sack), more preferably from about 4.5% to about 22% (from about 0.5 to about 2.5 gal/sack) and most preferably about 9% (about 1 gal/sack).

In order to prevent the aqueous latex from prematurely coagulating and increasing the viscosity of the cement composition, an effective amount of a latex stabilizer is included in the cement composition. Latex stabilizers are comprised of one or more surfactants which function to prevent latex coagulation. Those which are particularly suitable for use in accordance with the present invention are surfactants having the formula

$$R-Ph-O(OCH_2CH_2)_m OH$$

wherein R is an alkyl group having from about 5 to about 30 carbon atoms, Ph is phenyl and m is an integer in the range of from about 5 to about 50, and surfactants of the general formula

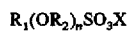

$$R_1(OR_2)_n SO_3 X$$

wherein $R_1$ is selected from the group consisting of alkyl groups having from 1 to about 30 carbon atoms, cycloalkyl groups having 5 or 6 carbon atoms, $C_1$–$C_4$ alkyl substituted cycloalkyl groups, phenyl, alkyl substituted phenyl of the general formula $(R_3)_a Ph-$ wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms, $R_2$ is a substituted ethylene group of the formula $-CH_2CH_2R_4$ wherein $R_4$ is selected from hydrogen, methyl, ethyl or mixtures thereof, and n is a number from 0 to about 40 provided that when $R_1$ is phenyl or alkyl substituted phenyl n is at least one, and X is any compatible cation. A preferred surfactant in this group is ethoxylated nonylphenyl containing in the range of from about 20 to about 30 moles of ethylene oxide.

Another preferred surfactant in the group is a sodium salt having the general formula

$$R_5-Ph(OR_6)_o SO_3 X$$

wherein $R_5$ is an alkyl group having in the range of from 1 to about 9 carbon atoms, $R_6$ is the group $-CH_2CH_2-$, o is an integer from about 10 to about 20 and X is a compatible cation.

Yet another preferred surfactant in the group is a sodium salt having the formula

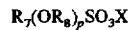

$$R_7(OR_8)_p SO_3 X$$

wherein $R_7$ is an alkyl group having in the range of from about 5 to about 20 carbon atoms, $R_8$ is the group $-CH_2CH_2-$, p is an integer in the range of from about 10 to about 40 and X is a compatible cation. A particularly preferred surfactant of this type is the sodium salt of a sulfonated compound derived by reacting a $C_{12}$ to $C_{15}$ alcohol with about 15 moles of ethylene oxide having the formula

$$H(CH_2)_{12-15}(CH_2CH_2O)_{15}SO_3Na$$

which is commercially available under the name "AVANEL S150™" from PPG Mazer, Mazer Chemicals, a Division of PPG Industries, Inc., 3938 Porett Drive, Gurnee, Ill. 60031.

Of the various latex stabilizers described above which can be used, ethoxylated nonylphenol containing in the range of from about 15 to about 40 moles of ethylene oxide and "AVANEL S150™", i.e., the sodium salt of a sulfonated and ethoxylated compound having the formula $H(CH_2)_{12-15}$ $(CH_2CH_2O)_{15}SO_3Na$ are preferred, with $H(CH_2)_{12-15}$ $(CH_2CH_2O)_{15}SO_3Na$ being the most preferred.

While different amounts of latex stabilizer are included in the cement composition depending on the particular aqueous rubber latex used, the latex stabilizer is usually included in the cement composition in an amount in the range of from about 9% to about 35% by weight of the aqueous rubber latex included therein (from about 0.02 to about 1.75 gal/sack of cement). When the aqueous latex is an aqueous styrene/butadiene latex, the latex stabilizer utilized is preferably included in the cement composition in an amount in the range of from about 9% to about 35% by weight of the aqueous rubber latex included in the composition (from about 0.02 to about 1.75 gal/sack of cement), more preferably from about 15% to about 25% (from about 0.04 to about 1.25 gal/sack) and most preferably about 20% (about 0.2 gal/sack).

While the water in the aqueous rubber latex used in forming the cement compositions of this invention can be adequate for producing a pumpable slurry and hydrating the cementitious materials therein, additional water can be added to the composition as required for pumpability. The water can be from any source provided it does not contain in excess of compounds that adversely affect other components in the cement composition. For example, the water can contain various salts such as sodium, potassium and calcium chloride or the like. Generally, water is present in a cement slurry composition of this invention in an amount in the range of from about 22% to about 95% by weight of hydraulic cement therein (from about 2.5 to about 10.7 gal/sack).

A light weight, foamed, highly resilient well cement composition of this invention is comprised of a hydraulic cement of the type described above, fumed silica as described above present in an amount in the range of from about 5% to about 30% by weight of hydraulic cement in the composition (from about 4.5 to about 30 lb/sack), an aqueous rubber latex of the type described above present in an amount in the range of from about 2.5% to about 45% by weight of hydraulic cement in the composition (from about 0.25 to about 5.0 gal/sack), an effective amount of a latex stabilizer of the type described above, an effective amount of a defoaming agent, a compressible gas present in an amount sufficient to foam the composition and produce a density in the range of from about 8 pounds per gallon to about 16 pounds per gallon, an effective amount of a foaming agent and an effective amount of a foam stabilizer.

The defoaming agent prevents foaming during mixing of the cement composition prior to foaming the composition. That is, because the aqueous rubber latex includes surfactants for emulsifying the latex and latex stabilizer which also function as foaming agents, a large bubble, unstable foam is produced when the hydraulic cement and silica are mixed with the latex.

The defoaming agent prevents the formation of the large bubble foam so that a small bubble stable foam can be subsequently formed. The defoaming agent can comprise any of the compounds well known for such capabilities such as the polyol silicon compounds. A preferred such defoaming agent is polydimethylsiloxane which is commercially available from Halliburton Energy Services of Duncan, Okla., under the trade designation "D-AIR™." The defoaming agent is generally included in the cement composition in an amount in the range of from about 0.1% to about 0.9% by weight of the hydraulic cement therein (from about 0.01 to about 0.1 gal/sack), more preferably from about 0.18% to about 0.7% (from about 0.02 to about 0.08 gal/sack) and most preferably about 0.18% (about 0.02 gal/sack).

The compressible gas functions to foam the cement composition, to prevent pressurized formation fluid influx into the cement composition when setting and contributes to the resiliency of the set composition. The gas is preferably nitrogen or air, with nitrogen being the most preferred. Generally, the gas is present in an amount sufficient to foam the cement slurry and produce a slurry density in the range of from about 8 to about 16 pounds per gallon, more preferably from about 12 to about 15 pounds per gallon and most preferably about 13 pounds per gallon. The amount of gas which is present in a foamed cement composition of this invention generally ranges from about 8.5% to about 50% by volume of the resulting foamed cement composition.

In order to facilitate foaming and to stabilize the foamed slurry, a foaming agent is included in the cement composition. Suitable foaming agents are surfactants having the general formula:

$$H(CH_2)_a(OC_2H_4)_bOSO_3X$$

wherein:
 a is an integer in the range of from about 5 to about 15;
 b is an integer in the range of from about 1 to about 10; and
 X is any compatible cation.

A particularly preferred foaming agent is a surfactant of the above type having the formula:

$$H(CH_2)_a(OC_2H_4)_3OSO_3Na$$

wherein:
 a is an integer in the range of from about 6 to about 10. This surfactant is commercially available from Halliburton Energy Services of Duncan, Okla., under the trade designation "CFA-S™."

Another particularly preferred foaming agent of the above mentioned type is a surfactant having the formula:

$$H(CH_2)_a(OC_2H_4)_bOSO_3NH_4$$

wherein:
 a is an integer in the range of from about 5 to about 15; and b is an integer in the range of from about 1 to about 10. This surfactant is available from Halliburton Energy Services under the trade name "HALLIBURTON FOAM ADDITIVE™."

Another foaming agent which can be utilized in the cement compositions of this invention includes polyethoxylated alcohols having the formula:

$$H(CH_2)_a(OC_2H_4)_bOH$$

wherein:
 a is an integer in the range of from about 10 to about 18; and
 b is an integer in the range of from about 6 to about 15. This surfactant is available from Halliburton Energy Services under the trade name "AQF-1™."

Yet another foaming agent which can be used is a sodium salt of alpha-olefinic sulfonic acid (AOS) which is a mixture of compounds of the formulas:

$$X[H(CH_2)_n\text{—}C\!=\!C\text{—}(CH_2)_mSO_3Na]$$

and $$Y[H(CH_2)_p\text{—}COH\text{—}(CH_2)_qSO_3Na]$$

wherein:
 n and m are individually integers in the range of from about 6 to about 16;
 p and q are individually integers in the range of from about 7 to about 17; and
 X and Y are fractions with the sum of X and Y being 1. This foaming agent is available from Halliburton Energy Services under the trade name "AQF-2™."

Still another foaming surfactant which can be used is an alcohol ether sulfate of the formula:

$$H(CH_2)_a(OC_2H_4)_bSO_3NH_4$$

wherein:
 a is an integer in the range of from about 6 to about 10; and
 b is an integer in the range of from about 3 to about 10.

The particular foaming agent employed will depend on various factors such as the types of formations in which the foamed cement is to be placed. Generally, the foaming agent utilized is included in a cement composition of this invention in an amount in the range of from about 1.5% to about 10% by weight of water in the composition. When the foaming agent is one of the preferred surfactants described above, it is included in the composition in an amount in the range of from about 4% to about 9.5% by weight of water therein.

A foam stabilizer is also included in the foamed cement composition to enhance the stability of the foamed cement slurry. One such foam stabilizing agent is a compound of the formula:

$$\underset{|}{\overset{R}{CH_3O(CH_2CHO)_n\text{—}R}}$$

wherein:

R is hydrogen or a methyl radical; and n is an integer in the range of from about 20 to about 200.
A particularly preferred foam stabilizing agent of the above type is a methoxypolyethylene glycol of the formula:

$$CH_3O(CH_2CH_2O)_nCH_2OH$$

wherein:

n is in the range of from about 100 to about 150.
This foam stabilizing agent is commercially available from Halliburton Energy Services under the trade designation "HALLIBURTON FOAM STABILIZER™."

The preferred foam stabilizing agent is a compound having the formula:

$$R-CONHCH_2CH_2CH_2N^+(CH_3)_2CH_2CO_2^-$$

wherein:

R is a $C_{10}$ to $C_{18}$ saturated aliphatic hydrocarbon group or an oleyl group or a linoleyl group.
A particularly preferred stabilizing agent of the above type is an amidopropylbetaine of the formula:

$$R-CONHCH_2CH_2CH_2N^+(CH_3)_2CH_2CO_2^-$$

wherein:

R is a cocoyl group.
This foam stabilizing agent is commercially available from Halliburton Energy Services under the trade designation "HC-2™."

The foam stabilizer is included in a cement composition of this invention in an amount in the range of from about 0.75% to about 5% by weight of water utilized. When the foam stabilizing agent is one of the particularly preferred agents described above, it is preferably present in the composition in an amount in the range of from about 2% to about 5% by weight of water.

Another foamed well cement composition of this invention is comprised of a hydraulic cement of the type described above, an aqueous rubber latex described above present in an amount in the range of from about 2.5% to about 45% by weight of hydraulic cement in the composition (from about 0.25 to about 5 gal/sack), an effective amount of a latex stabilizer described above, an effective amount of a defoaming agent described above, a compressible gas described above present in an amount sufficient to foam the cement composition and produce a cement composition density in the range of from about 8 pounds per gallon to about 16 pounds per gallon, an effective amount of a foaming agent described above and an effective amount of a foam stabilizer described above.

This foamed cement composition which is preferred in some applications does not include fumed silica, but it is also light weight, resilient and resists pressurized formation fluid migration.

The well cement compositions useful herein can include other additives which are well known to those skilled in the art including fluid loss control additives, set retarding additives, dispersing agents, formation conditioning additives, set accelerators and the like.

Dispersing agents can be utilized to facilitate the use of lower quantities of water and to promote higher set cement strength. A particularly suitable dispersing agent for use with the well cement compositions of this invention is comprised of the condensation polymer product of an aliphatic ketone, an aliphatic aldehyde and a compound which introduces acid groups into the polymer, e.g., sodium sulfite. Such a dispersant is described in U.S. Pat. No. 4,557,763 issued to George et al. on Dec. 10, 1985 which is incorporated herein by reference.

Examples of fluid loss control additives are cellulose derivatives such as carboxymethylhydroxyethylcellulose, hydroxyethylcellulose, modified polysaccharides, polyacrylamides, guar gum derivatives, 2-acrylamido-2-methylpropane sulfonic acid copolymers, polyethyleneamine and the like.

Set retarding additives are included in the cement compositions when it is necessary to extend the time in which the cement composition can be pumped so that it will not thicken or set prior to being placed at a desired location in the well being cemented. Examples of set retarders which can be used include lignosulfonates such as calcium and sodium lignosulfonate, organic acids such as tartaric acid and gluconic acid, copolymers and others. The proper amount of retarder required for particular conditions can be determined by conducting a "thickening time test" for the particular retarder and cement composition. Such tests are described in the *API Specification For Materials and Testing for Well Cements*, API Specification 10 mentioned above.

A particularly preferred set retarder for use in accordance with the present invention is a copolymer or copolymer salt of 2-acrylamido-2-methylpropanesulfonic acid and acrylic acid. The copolymer comprises from about 40 to about 60 mole percent 2-acrylamido-2-methylpropanesulfonic acid with the balance comprising acrylic acid, and the copolymer or salt preferably has an average molecular weight below about 5,000. This copolymer set retarder is preferably utilized in the composition when the bottom hole circulating temperature exceeds about 200° F. The retarder has been found to both retard the setting of the cement at elevated formation temperatures and to stabilize the aqueous styrene/butadiene latex against agglomeration or inversion at the elevated temperature. The set retarder is generally added to the cement composition in an amount in the range of from about 0.1% to about 6% by weight of hydraulic cement in the composition.

The cement compositions of this invention may be prepared in accordance with any of the well known mixing techniques so long as the latex and latex stabilizing surfactant are not directly admixed without prior dilution by other liquids present. In one preferred method, a quantity of water is introduced into a cement blender and defoamer, latex and latex stabilizer are then sequentially added with suitable agitation to disperse the constituents. Any other liquid additives may then be admixed with the slurry followed by the hydraulic cement, fumed silica and other dry solids. The mixture is agitated for a sufficient period of time to admix the components and form a pumpable non-foamed slurry. When the slurry is foamed, it is pumped to the well bore and the foaming agent and foam stabilizer followed by the gas are injected into the slurry on the fly. As the slurry and gas flow through the well bore to the location where the resulting foamed cement composition is to be placed, the cement composition is foamed and stabilized.

The methods of this invention for cementing a zone in a well basically comprise the steps of placing a cement composition of this invention which sets into a highly resilient, high bond strength, substantially impermeable mass in the subterranean zone to be cemented, and maintaining the cement composition in the zone for a time sufficient for the cement composition to set therein.

In order to further illustrate the improved cement compositions and methods of this invention, the following examples are given.

Example 1

Test samples of non-foamed cement compositions of this invention comprised of API Portland Class H hydraulic cement, fumed silica, a dispersant, an aqueous styrene/butadiene latex, a latex stabilizer, and a defoaming agent were prepared. Two of the test samples also included an expansion additive. Descriptions of the test samples are set forth in Table I below.

Portions of each of the test samples were placed in shear bond and hydraulic bond test apparatus and allowed to set for time periods of 1 week at a temperature of 140° F. and atmospheric pressure. The test samples were then tested for shear bond strength and hydraulic bond strength.

The shear bond strength of set cement in the annulus between a pipe disposed in a well bore and the walls of the well bore is defined as the strength of the bond between the set cement and a pipe mechanically supported by the cement. The test sample shear bond strengths were determined by measuring the force required to initiate movement of pipe sections cemented by the test samples in test apparatus simulating a well bore, i.e., larger diameter pipe sections. The determined forces were divided by the cement-pipe contact surface areas to yield the shear bond strengths in psi.

The hydraulic bond strength of the set cement blocks migration of pressurized fluids in a cemented annulus. The test sample hydraulic bond strengths were determined by applying pressure at the pipe-set cement interfaces until leakage occurred. The hydraulic bond strength of a set cement test sample in psi is equal to the hydraulic pressure applied when leakage took place. The results of these tests are also set forth in Table I below.

TABLE I

Non-Foamed Cement Composition Bond Strength Test Results

| | | Cement Composition Components | | | | | | | | |
|---|---|---|---|---|---|---|---|---|---|---|
| Sample No. | Hydraulic Cement | Fumed Silica, % by Weight of Cement | Aqueous Latex[1], gal per 94 lb sack of Cement | Latex Stabilizer[2], gal per 94 lb sack of Cement | Expansion Additive[3], % by Weight of Cement | Defoaming Agent[4], gal per 94 lb sack of Cement | Water, % by Weight of Cement | Dispersant[5], % by Weight of Cement | Density, lb/gal | Shear Bond Strength, psi | Hydraulic Bond Strength, psi |
| 1 | Portland Class H | 10 | 0.5 | 0.05 | — | 0.02 | 52.83 | 0.5 | 15 | 86 | 1074 |
| 2 | Portland Class H | 10 | 0.5 | 0.05 | 5 | 0.02 | 55.97 | 0.5 | 15 | 355 | 998 |
| 3 | Portland Class H | 10 | 1.0 | 0.1 | — | 0.02 | 47.98 | 0.5 | 15 | 200 | 285 |
| 4 | Portland Class H | 10 | 1.0 | 0.1 | 5 | 0.02 | 51.12 | 0.5 | 15 | 292 | 290 |

[1] Aqueous styrene/butadiene (25%:75% by wt.) latex containing 50% by weight water ("LATEX 2000 ™" from Halliburton Energy Services).
[2] Sodium salt of sulfonated and ethoxylated compound having the formula $H(CH_2)_{12-15}(CH_2CH_2O)_{15}SO_3Na$ ("AVANEL S150 ™" from PPG Mazer).
[3] Cement expansive additive ("MICROBOND M ™" from Halliburton Energy Services, Duncan, Oklahoma).
[4] Polydimethylsiloxane.
[5] Condensation polymer product of ketone, aldehyde and sodium sulfite ("CFR-3 ™" from Halliburton Energy Services of Duncan, Oklahoma).

From Table I, it can be seen that the non-foamed cement compositions of this invention have excellent shear and hydraulic bond strengths.

Example 2

Test samples of foamed cement compositions of this invention comprised of hydraulic cement, fumed silica, an aqueous rubber latex, a latex stabilizer, a defoaming agent, air, a foaming agent and a foam stabilizer were prepared. One of the foamed cement, compositions also included hemitite weighting material, 100 mesh sand, a set retarder and a retarder intensifier. For each test sample, an unfoamed cement slurry including the defoaming agent was first prepared utilizing a mixing device. A predetermined amount of the resulting slurry was then placed in a fixed volume blender jar having a stacked blade assembly. The foaming agent and foam stabilizer were then added to the jar and the contents were mixed at high speed. The high speed mixing by the stacked blade assembly caused the slurry to be foamed with air. Descriptions of the test samples are set forth in Table IIA below.

The foamed test samples were allowed to set for 1 week at 140° F. and atmospheric pressure after which portions of the test samples were subjected to various tests to determine their properties. More specifically, unconfined uniaxle and confined triaxial strength tests were conducted and Young's Moduli and Poisson's Ratios were determined as well as bulk compressibilities, shear moduli and tensile strengths, all in accordance with the standardized tests and procedures of the American Society for Testing and Materials (ASTM) set forth, for example, in ASTM Section D 1456. The results of the tests and determinations are set forth in Table IIB below.

TABLE IIA

Foamed Cement Composition

Cement Composition Components

| Sample No. | Hydraulic Cement | Fumed Silica, % by Weight of Cement, or gal per 94 lb Sack of Cement | Aqueous Rubber Latex, gal per 94 lb Sack of Cement | Latex Stabilizer[2], gal per 94 lb Sack of Cement | Hemitite, % by Weight of Cement | Fluid Loss Control Agent[3], % by Weight of Cement | Sand (100 Mesh), % by Weight of Cement | Set Retarder[4], % by Weight of Cement | Set Retarder Intensifier[5] % by Weight of Cement |
|---|---|---|---|---|---|---|---|---|---|
| 1 | Portland Class H | 10% | 1 | 0.2 | — | — | — | — | — |
| 2 | Portland Class H | 10% | 2 | 0.2 | — | — | — | — | — |
| 3 | Portland Class H | 1.63 gal/sk[9] | 1 | 0.3[10] | 200 | 0.5 | 40 | 3.3 | 2.4 |

Cement Composition Components

| Sample No. | Defoaming Agent[6], gal per 94 lb Sack of Cement | Foaming Agent[7], % by Weight of Water | Foam Stabilizer[8], % by Weight of Water | Water, gal per 94 lb Sack of Cement | Density of Base Slurry, lb/gal | Density, lb/gal |
|---|---|---|---|---|---|---|
| 1 | 0.02 | 7.5 | 3.75 | 5.41 | 15 | 13.6 |
| 2 | 0.02 | 9.4 | 4.7 | 4.32 | 15 | 13.6 |
| 3 | 0.02 | 4.5 | 2.3 | 5.01 | 22 | 17 |

[1]Aqueous styrene/butadiene (25%:75% by wt.) latex containing 50% by weight water ("LATEX 2000 ™" from Halliburton Energy Services).
[2]Sodium salt of a sulfonated and ethoxylated compound having the formula $H(CH_2)_{12-15}(CH_2CH_2O)_{15}SO_3Na$ ("AVANEL S150 ™" from PPG Mazer).
[3]Copolymer of "AMPS ™" and N,N-dimethylacrylamide (U.S. Pat. No. 4,555,269).
[4]Copolymer of "AMPS ™" and acrylic acid (U.S. Pat. No. 4,941,536).
[5]Tartaric acid.
[6]Polydimethylsiloxane.
[7]Sodium salt of alpha-olefinic sulfonic acid.
[8]Cocoylamidopropylbetaine.
[9]Aqueous dispersion of 50% fumed silica by weight of water.
[10]Ethoxylated nonylphenol with 15–40 moles of ethylene oxide substituted for latex stabilizer described in footnote 2.

TABLE IIB

Bond Strength And Resiliency Test Results

| Sample No. | Shear Bond Strength, psi | Hydraulic Bond Strength, psi | Unconfined Uniaxial Young's Modulus ($E \times 10^6$) | Unconfined Uniaxial Poissons Ratio | Unconfined Uniaxial Compressive Strength, psi | Confined Triaxial Young's Modulus ($E \times 10^6$) Confining Pressure, psi 500 | 1000 | 2000 | Confined Triaxial Poisson's Ratio Confining Pressure, psi 500 | 1000 | 2000 |
|---|---|---|---|---|---|---|---|---|---|---|---|
| 1 | 163(13.8)[1] | 630 | — | — | 1388[2] | 0.048 | 0.312 | 0.091 | 0.158 | 0.1494 | 0.079 |
| 2 | 154(13.85)[1] | 720 | — | — | 1460[2] | 0.076 | 0.304 | 0.026 | 0.090 | 0.2883 | 0.065 |
| 3 | — | — | 0.35 | 0.107 | 2700[2] | 0.26 | 0.3 | 0.282 | 0.086 | 0.144 | 0.109 |

| Sample No. | Confined Triaxial Plastic Failure, psi Confining Pressure, psi 500 | 1000 | 2000 | Bulk Compressiblity at 1000 psi, $10^5$ psi | Shear Modulus at 1000 psi, $10^4$ psi | Tensile Strength (Briquet), psi | Failure Envelope Friction Angle, Degrees |
|---|---|---|---|---|---|---|---|
| 1 | 2900 | 4200 | 4000 | 0.94 | 13.57 | 194[3] | 31.5 |
| 2 | 2255 | 3200 | 3100 | 0.418 | 11.8 | 250[3] | 19.5 |
| 3 | 3850 | 4925 | 6950 | 6.2 | — | — | 22 |

[1]The number in parentheses is the test sample density in lb/gal.
[2]The base pressure was 2220 psi.
[3]The base pressure was 286 psi.

From the results set forth in Table IIB, it can be seen that the foamed cement compositions of this invention have excellent bond strengths and resiliencies.

Example 3

Test samples of additional foamed cement compositions of this invention comprised of API Portland Class G hydraulic cement, an aqueous rubber latex, a latex stabilizer, a fluid loss control agent, a set accelerator, a defoaming agent, air, a foaming agent, and a foam stabilizer were prepared. For each test sample, a base unfoamed cement slurry including the defoaming agent was first prepared followed by foaming of the base slurry with a foaming agent and foam stabilizer as described in Example 2 above.

The various strength tests and modulus and ratio determinations described in Example 2 were conducted and determined.

The descriptions of the test samples are set forth in Table IIIA below and the results of the tests and determinations are set forth in Table IIIB below.

TABLE IIIA

Foamed Cement Compositions

Cement Composition Components

| Sample No. | Hydraulic Cement | Sand (100 mesh), % by Weight of Cement | Aqueous Rubber Latex[1], gal per 94 lb Sack of Cement | Latex Stabilizer[2], gal per 94 lb Sack of Cement | Fluid Loss Control Agent[3], % by Weight of Cement | Biopolymer[4], % by Weight of Cement | Accelerator[5], % by Weight of Cement | Defoaming Agent[6], gal per 94 lb Sack of Cement | Foaming Agent[7], % by Weight of Water | Foam Stabilizer[8], % by Weight of Water |
|---|---|---|---|---|---|---|---|---|---|---|
| 1 | Portland Class G | 100 | 1 | 0.3 | 0.2 | 0.14 | 4 | 0.02 | 4.3 | 2.2 |
| 2 | Portland Class G | 100 | 1 | 0.3 | 0.2 | 0.14 | 4 | 0.02 | 4.3 | 2.2 |
| 3 | Portland Class G | 100 | 2 | 0.3 | 0.2 | 0.22 | 4 | 0.02 | 5.1 | 2.6 |
| 4 | Portland Class G | 100 | 2 | 0.3 | 0.2 | 0.22 | 4 | 0.02 | 5.1 | 2.6 |
| 5 | Portland Class G | — | 5 | 0.3 | 0.5 | — | 2 | 0.02 | 5.2 | 2.6 |

Cement Composition Components

| Sample No. | Water, gal per 94 lb Sack of Cement | Density of Base Slurry, lb/gal | Foamed Density lb/gal |
|---|---|---|---|
| 1 | 6.28 | 16.3 | 14 |
| 2 | 6.28 | 16.3 | 12 |
| 3 | 5.28 | 16.3 | 14 |
| 4 | 5.28 | 16.3 | 12 |
| 5 | 3.33 | 17.5 | 15 |

[1]Aqueous styrene/butadiene (25%:75% by wt.) latex containing 50% by weight water ("LATEX ™" from Halliburton Energy Services).
[2]Sodium salt of a sulfonated and ethoxylated compound having the fomulra $H(CH_2)_{12-15}(CH_2CH_2O)_{15}SO_3Na$ ("AVANEL S150 ™" from PPG Mazer).
[3]Copolymer of "AMPS ™" and N,N-dimethylacrylamide (U.S. Pat. No. 4,555,269).
[4]Welan gum.
[5]Calcium chloride.
[6]Polydimethylsiloxane.
[7]Sodium salt of alpha-olefinic sulfonic acid.
[8]Cocoylamidopropylbetaine.

TABLE IIIB

Bond Strength And Resiliency Test Results

| | | | | | | Confined Triaxial | | | | | |
| | Shear | Hydraulic | Unconfined Uniaxial | | | Young's Modulus | | | Poisson's | | |
| | Bond | Bond | Young's | | Compressive | ($E \times 10^6$) | | | Ratio | | |
| Sample | Strength, | Strength, | Modulus | Poissons | Strength, | Confining Pressure, psi | | | Confining Pressure, psi | | |
| No. | psi | psi | ($E \times 10^6$) | Ratio | psi | 500 | 1000 | 2000 | 500 | 1000 | 2000 |
|---|---|---|---|---|---|---|---|---|---|---|---|
| 1 | 303 | 780 | — | — | — | — | 0.039 | — | — | 0.1187 | — |
| 2 | 244(12.1)[1] | 660 | — | — | — | — | 0.029 | — | — | 0.0436 | — |
| 3 | 322(14.1)[1] | 775 | — | — | — | — | 0.048 | — | — | 0.1478 | — |
| 4 | 287(12.2)[1] | 660 | — | — | — | — | 0.0353 | — | — | 0.1808 | — |
| 5 | 86(15.4)[1] | 700 | 0.0025 | 0.102 | 392[2] | 0.013 | 0.013 | 0.025 | 0.078 | 0.128 | 0.171 |

TABLE IIIB-continued

Bond Strength And Resiliency Test Results

| | Confined Triaxial Plastic Failure, psi Confining Pressure, psi | | | Bulk Compressiblity at 1000 psi, 10⁵ | Shear Modulus at 1000 psi, 10⁴ | Tensile Strength (Briquet), | Failure Envelope Friction Angle, |
|---|---|---|---|---|---|---|---|
| Sample No. | 500 | 1000 | 2000 | psi | psi | psi | Degrees |
| 1 | — | 3220 | — | 5.86 | 1.745 | — | — |
| 2 | — | 2000 | — | 9.44 | 1.389 | — | — |
| 3 | — | 3700 | — | 4.4 | 2.09 | — | — |
| 4 | — | 2200 | — | 5.47 | 1.482 | — | — |
| 5 | 1948 | 3096 | 4857 | 17.169 | 0.576 | 232[3] | 9 |

[1]The number in parentheses is the test sample density in lb/gal.
[2]The base pressure was 2220 psi.
[3]The base pressure was 286 psi.

From the results set forth in Table IIIB, it can be seen that the additional foamed cement compositions of this invention also have excellent bond strengths and resiliencies.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A well cement composition having improved mechanical properties including elasticity and ductility comprising:

a hydraulic cement;

an aqueous rubber latex present in an amount in the range of from about 2.5% to about 45% by weight of hydraulic cement in said composition;

an effective amount of a latex stabilizer;

a defoaming agent comprised of polydimethylsiloxane present in an amount in the range of from about 0.1% to about 0.9% by weight of cement in said composition;

a gas present in an amount sufficient to foam said cement composition and produce a cement composition density in the range of from about 8 to about 16 pounds per gallon;

an effective amount of a foaming agent; and an effective amount of a foam stabilizer.

2. The composition of claim 1 wherein said latex stabilizer is selected from the group consisting of surfactants having the formula $$R-Ph-O(OCH_2CH_2)_m OH$$

wherein R is an alkyl group having from about 5 to about 30 carbon atoms, Ph is phenyl and m is an integer in the range of from about 5 to about 50,
and surfactants of the general formula $$R_1(OR_2)_n SO_3 X$$

wherein $R_1$ is selected from the group consisting of alkyl groups having from 1 to about 30 carbon atoms, cycloalkyl groups having 5 or 6 carbon atoms, $C_1-C_4$ alkyl substituted cycloalkyl groups, phenyl, alkyl substituted phenyl of the general formula $(R_3)_a Ph-$ wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms, $R_2$ is a substituted ethylene group of the formula $-CH_2CH_2R_4$ wherein $R_4$ is selected from hydrogen, methyl, ethyl or mixtures thereof, and n is a number from 0 to about 40 provided that when $R_1$ is phenyl or alkyl substituted phenyl n is at least one, and X is any compatible cation.

3. The composition of claim 1 wherein said foaming agent is comprised of the sodium salt of alpha-olefinic sulfonic acid and is present in an amount in the range of from about 4% to about 9.5% by weight of water in said composition.

4. The composition of claim 1 wherein said foam stabilizer is comprised of an amidopropylbetaine of the formula:

$$R-CONHCH_2CH_2CH_2N^+(CH_3)_2 CH_2CO_2^-$$

wherein R is a cocoyl group, and present in an amount in the range of from about 2% to about 5% by weight of water in said composition.

5. The composition of claim 1 wherein water is present in said composition in an amount in the range of from about 22% to about 95% by weight of cement therein.

6. The composition of claim 1 wherein said hydraulic cement is Portland cement.

7. The composition of claim 1 wherein said aqueous rubber latex is an aqueous styrene/butadiene latex.

8. The composition of claim 7 wherein said aqueous styrene/butadiene latex contains water in an amount of about 50% by weight of said latex, and the weight ratio of styrene to butadiene in said latex is about 25%:75%.

9. The composition of claim 7 wherein said latex stabilizer is present in said cement composition in an amount in the range of from about 9% to about 35% by weight of said aqueous styrene/butadiene latex therein.

10. The composition of claim 9 wherein said latex stabilizer is selected from the group consisting of nonylphenol ethoxylated with in the range of from about 15 to about 40 moles of ethylene oxide and the sodium salt of a sulfonated and ethoxylated compound having the formula $H(CH_2)_{12-15}(CH_2CH_2O)_{15}SO_3Na$.

11. A method of cementing in a subterranean well whereby the set cement can withstand impacts, shocks and cemented pipe movements subsequently generated by drilling and other well operations without cracking, shattering or otherwise failing comprising the steps of:

introducing a cement composition which sets into a high strength solid mass having elasticity and ductility into said well, said cement composition comprising:

a hydraulic cement, an aqueous rubber latex present in an amount in the range of from about 2.5% to about 45% by weight of hydraulic cement in said composition, an effective amount of a latex stabilizer, a defoaming agent comprised of polydimethylsiloxane present in an amount in the range of from about 0.1% to about 0.9% by weight of hydraulic cement in said composition, a gas present in an amount sufficient to foam said cement composition and produce a cement composition density in the range of from about 8 to about 16 pounds per gallon, an effective amount of a foaming agent, and an effective amount of a foam stabilizer; and allowing said cement composition to set in said well.

12. The method of claim 11 wherein said latex stabilizer in said cement composition is selected from the group consisting of surfactants having the formula $$R-Ph-O(OCH_2CH_2)_mOH$$

wherein R is an alkyl group having from about 5 to about 30 carbon atoms, Ph is phenyl and m is an integer in the range of from about 5 to about 50, and surfactants of the general formula $$R_1(OR_2)_nSO_3X$$

wherein $R_1$ is selected from the group consisting of alkyl groups having from 1 to about 30 carbon atoms, cycloalkyl groups having 5 or 6 carbon atoms, $C_1$-$C_4$ alkyl substituted cycloalkyl groups, phenyl, alkyl substituted phenyl of the general formula $(R_3)_aPh-$ wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms, $R_2$ is a substituted ethylene group of the formula $-CH_2CH_2R_4$ wherein $R_4$ is selected from hydrogen, methyl, ethyl or mixtures thereof, and n is a number from 0 to about 40 provided that when $R_1$ is phenyl or alkyl substituted phenyl n is at least one, and X is any compatible cation.

13. The method of claim 11 wherein said foaming agent in said composition is comprised of the sodium salt of alpha-olefinic sulfonic acid and is present in an amount in the range of from about 4% to about 9.5% by weight of water in said composition.

14. The method of claim 11 wherein said foam stabilizer in said composition is comprised of an amidopropylbetaine of the formula:

$$R-CONHCH_2CH_2CH_2N^+(CH_3)_2CH_2CO_2^-$$

wherein R is a cocoyl group and is present in an amount in the range of from about 2% to about 5% by weight of water in said composition.

15. The method of claim 11 wherein water is present in said cement composition in an amount in the range of from about 22% to about 95% by weight of cement therein.

16. The method of claim 11 wherein said hydraulic cement in said composition is Portland cement.

17. The method of claim 11 wherein said aqueous rubber latex in said composition is an aqueous styrene/butadiene latex.

18. The method of claim 17 wherein said aqueous styrene/butadiene latex contains water in an amount of about 50% by weight of said latex, and the weight ratio of styrene to butadiene in said latex is about 25%:75%.

19. The method of claim 17 wherein said latex stabilizer is present in said cement composition in an amount in the range of from about 9% to about 35% by weight of said aqueous styrene/butadiene latex therein.

20. The method of claim 19 wherein said latex stabilizer in said composition is selected from the group consisting of nonylphenol ethoxylated with in the range of from about 20 to about 30 moles of ethylene oxide and a sodium salt of a sulfonated and ethoxylated compound having the formula $H(CH_2)_{12-15}(CH_2CH_2O)_{15}SO_3Na$.

* * * * *